May 20, 1947.    F. F. STELZ    2,420,759
SHAPING MACHINE
Filed Feb. 12, 1945    2 Sheets-Sheet 1
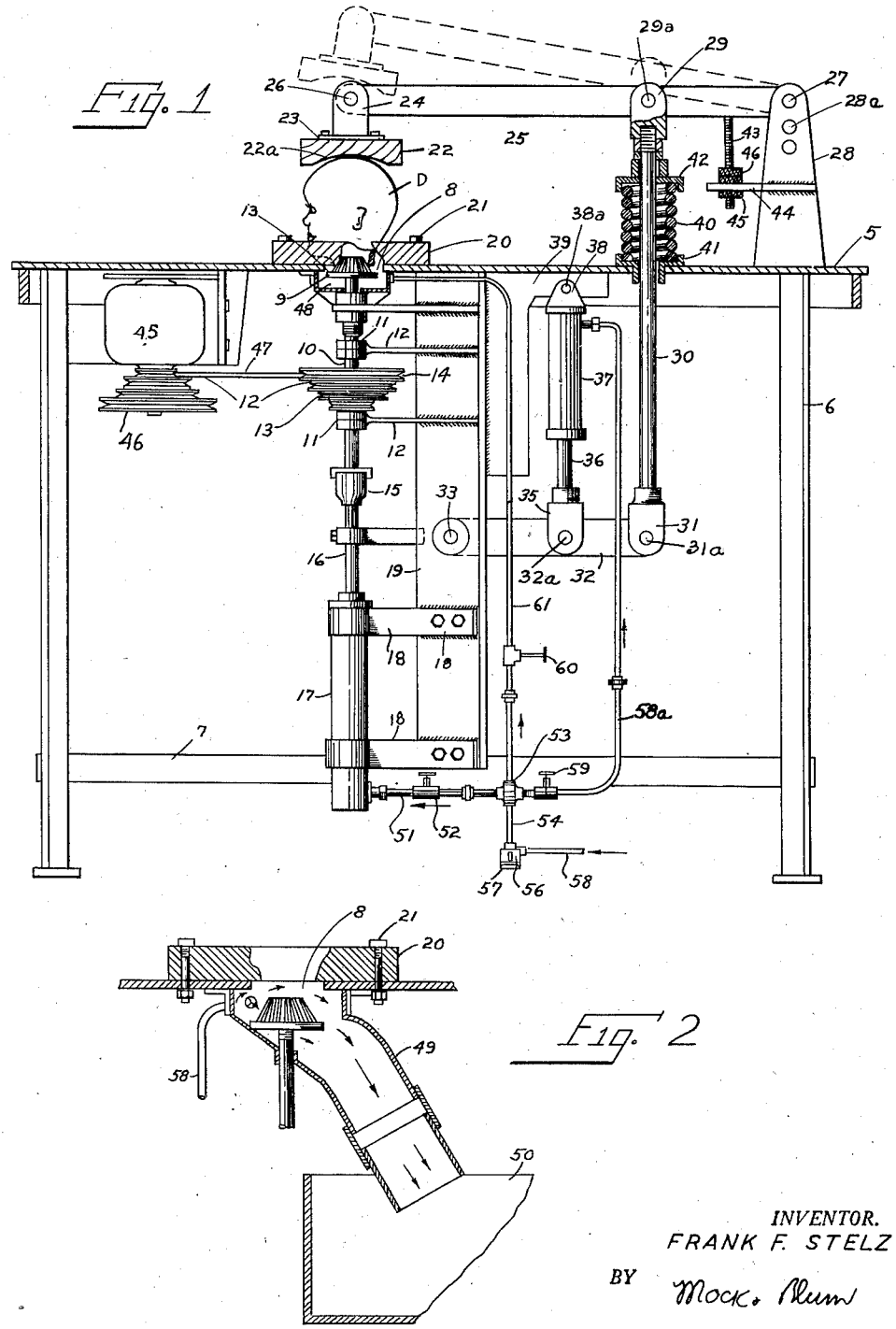
INVENTOR.
FRANK F. STELZ
BY Mock & Blum
ATTORNEYS May 20, 1947.  F. F. STELZ  2,420,759
SHAPING MACHINE
Filed Feb. 12, 1945  2 Sheets-Sheet 2

INVENTOR.
FRANK F. STELZ
BY Mock, Blum
ATTORNEYS

Patented May 20, 1947

2,420,759

UNITED STATES PATENT OFFICE 2,420,759

SHAPING MACHINE

Frank F. Stelz, Sunnyside, Long Island, N. Y., assignor to Ideal Novelty & Toy Co., Long Island City, N. Y., a corporation of New York Application February 12, 1945, Serial No. 577,483

3 Claims. (Cl. 77—4)

This invention relates to an air-controlled machine for reaming the interior walls of the neck-openings of doll-heads. One of its objects is to provide a motor-driven reaming tool with means for shifting the tool into reaming position, and a means operated simultaneously therewith for clamping a doll head in a mould or rest, in position for the reaming tool to ream the interior wall of the doll head.

Another object of the invention is to combine in a machine for reaming doll heads, a motor-driven reaming tool, means for clamping a doll head in position for the reaming tool to operate on said head, and means for shifting the reaming tool to engage the doll head, both means being controlled by air pressure and being constructed to operate while the reaming tool is being driven, so that rapid production reaming of doll heads may be accomplished.

With the above and other objects in view the invention relates to certain new and useful constructions, combinations, and arrangements of parts, clearly described in the following specification, and fully illustrated in the accompanying drawings, in which:

Fig. 1 is a front elevation of the machine, with some parts shown in vertical section.

Fig. 2 is a detail sectional view, showing the chute and receiver for the waste.

Figure 3:
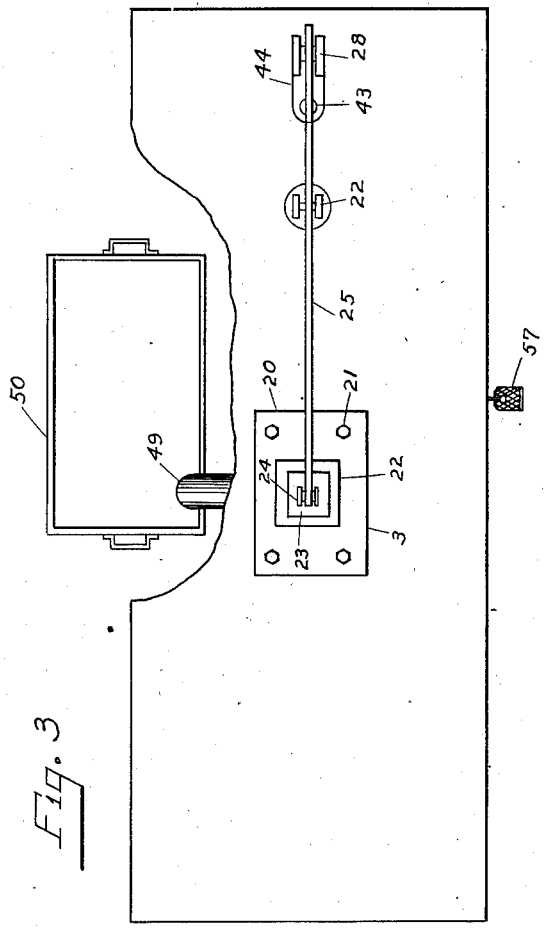
Fig. 3 is a top plan view, partly broken away in order to expose the discharge end of the chute and all of the waste receiver.

The machine has a table or bench top 5 which is supported by the legs 6, the lower ends of which are connected to each other by the bars 7.

The table or bench top 5 is constructed with an opening 8, through which the reaming tool 9 is adapted to project when said reaming tool is moved upwardly. This reaming tool 9 is mounted on the vertical reaming shaft 10, which turns in the bearings 11 of the bracket arms 12. These bracket arms 12 are fixed to fixed angle 19.

A cone pulley 13, which has a series of horizontal grooves of respective different diameters, is fixed to the reaming shaft 10.

The lower end of the shaft 10 is turnably supported in the end-thrust bearing 15, which is fixed to the upper end of the plunger rod 16, the lower end of which has a piston which extends into the air cylinder 17, which is supported from the table 5 by means of the bracket arms 18, which are fixed to arm or angle 19. The top of arm or angle 19 is fixed to table 5.

A hollow head-holder or rest 20 is fixed to bench-top 5 by bolts 21. The neck of the doll-head D can be inserted into the hollow of said holder 20. A part of the periphery of the head D is supported on the inner edge-wall of the holder 20. The head D is clamped into the operative position which is shown in Fig. 1, by a rigid clamping or pressure block 22. This block 22 has a bottom recess 22a. The block 22 holds the head D fixed in the operative reaming position, so that head D cannot turn or otherwise move, during the reaming operation. In said operative position, the vertical axis of the neck-opening or neck-portion of the head D is coincident with the common vertical axis of rotation of the reamer shaft 10 and the reamer tool 9.

The pressure block or clamping-head 22 is fixed to the base 23 of the member 24, which is pivoted to the inner or free end of the lever 25, by the pivot pin 26. This lever 25 is pivotally connected at its outer end by the pivot pin 27 to the upstanding supporting post 28, which is formed with vertically spaced bearing holes 28a to receive the pivot pin 27 at different levels, so that different level adjustments may be made for the lever 25. The bottom of post 28 is fixed to table 5.

The lever 25 is pivotally connected at 29a to the bifurcated member 29, which is fixed to the threaded upper end of the pull-rod 30, the lower end of which is fixed to the bifurcated member 31, which is pivoted at 31a to the lever 32, the inner end of which is pivotally connected by pivot-pin 33 to the angle 19.

The lever 32 is pivotally connected at 32a to the bifurcated member 35, which is fixed to the lower end of the plunger rod 36, the upper end of which has a piston which slides in the air cylinder 37, which is fixed at its upper end to the member 38, which is pivotally connected at 38a to the frame piece or member 39, which is fixed to the bench top 5.

A compression coil spring 40 is arranged around the pull rod 30. The lower end of this spring 40 abuts the pressure disc 41 which is fixed to bench top 5. The upper end of spring 40 abuts the pressure disc 42, which abuts the pivot member 29 which is provided at the upper end of the pull rod 30. The downward turning movement of the upper lever 25 around pivot 27 is limited by the threaded stop 43, which is vertically adjusted on the bracket arm 44, carried by the post 28, by means of the nuts 45 and 46.

The reaming shaft 10 is rotated at the constant selected angular velocity, by means of the motor 45, which is fixed to the underside of the bench or table top 5. The shaft of motor 45 is provided with a cone pulley 46, having belt grooves of different diameter, which are engaged by the V-belt 47, which drives the cone pulley 13 of the reaming shaft 10. The desired operating speed of the reaming shaft 10 is selected by locating the drive belt 47 in respective horizontally alined grooves of pulleys 46 and 13.

The waste material which is removed from the interior wall of the neck-opening of the doll head D by the reaming tool 9, falls into a pocket 48, arranged immediately below the opening 8, and a lateral chute 49 carries this waste material to the receiver 50.

The machine is provided with an air-line pipe 58, one end of which is connected to a source of air under pressure. The other end of pipe 58 is connected to the casing of a conventional valve 56. Valve 56 controls the passage of air from pipe 58 to a branch pipe 54, which is connected to a distributor coupling 53. Said coupling 53 is connected by pipe 51 to the lower end of cylinder 17, so that when compressed air is admitted into cylinder 17, the rod or plunger 16 will be raised, thus elevating the reamer tool 9 to the operating position which is shown in Fig. 1. Rod 16 can be sufficiently lowered, so that reamer 9 will be located wholly below the table top 5, so that the hand of the operator cannot touch said teeth, when the reamer 9 is in inoperative lower position. The supply of compressed air to the lower end of cylinder 17, through pipe 51, is controlled by hand-operated valve 52, which may be closed, if desired.

Pipe 58a connects said coupling 53 to the upper end of cylinder 37. The supply of compressed air to said upper end of cylinder 37, through pipe 58a, is controlled by hand-operated valve 59, which can be closed, if desired. When compressed air is supplied to cylinder 37, the rod 36 will be lowered against the upward biasing force of spring 40, thus lowering the clamping block 22, and clamping the head D in position, so that head D cannot rise or turn or otherwise shift during the reaming operation.

The reamer shaft 10 is constantly rotated at constant predetermined speed, by means of pulley 13, belt 47, and pulley 46, which is fixed to the shaft of the electric motor 45. The respective constant angular velocity of reamer shaft 10 is selected by the location of belt 47 in any two horizontally alined respective grooves of pulleys 46 and 13. The belt 47 is sufficiently flexible so that it will remain in said grooves when shaft 10 is lowered from its operative position. If desired, pulley 13 can be turnably supported on the respective bearing 12, and said pulley 13 can be keyed to shaft 10, so that shaft 10 can be raised and lowered while pulley 13 remains in the position shown in Fig. 1.

Valve 56 can be opened manually or by foot-pedal 57.

Valve 56 is biased to a position in which it normally prevents the admission of air from pipe 58 to pipe 54. In said normal position, valve 56 has a bleed port, through which the compressed air in cylinders 17 and 37 can escape to the atmosphere. Hence, when the foot-pedal 56 is released, the supply of compressed air to cylinders 17 and 37 is shut off, and the compressed air in said cylinders 17 and 37 escapes rapidly therefrom, so that shaft 10 and reamer 9 are lowered to the inoperative position of reamer 9, and pressure plate 22 is raised to its inoperative position. Valve 56 is conventional and well-known per se, so that it need not be specifically illustrated. Such valves are well-known in pressing machines.

The automatic lowering of the reaming tool 9 below operative position, at the end of each reaming operation, provides a bench top which is wholly free from the teeth of said tool 9, thus providing maximum safety. All that the operator is required to do is to handle the doll head D, and to open and to release the valve 56.

That is, when the reaming tool is in operative position, the clamping-head 22 sufficiently blocks the bore of rest 20, so that a doll-head cannot be placed in operating position.

By changing the reaming tool 9 and changing the rest or mould 20, the machine may be adapted for reaming the neck openings of heads of different sizes.

I claim:

1. A machine for reaming the interior wall of the neck-portion of a doll-head, comprising a frame, a table connected to said frame, said table having an opening, a hollow support fixed to the top of said table in registration with said opening, a bearing located below said table and connected to said table, a vertical shaft located in said bearing, said shaft being turnable in said bearing and being vertically movable in said bearing, a reamer fixed to the top of said shaft, drive mechanism for rotating said shaft, said shaft and said reamer having a common vertical axis which is coincident with the axis of said hollow support, the lower end of said shaft being turnably connected to a plunger, the lower end of said plunger extending piston-like into the upper end of a first air-cylinder, a clamping device located above said support, said clamping device being connected to an upper lever which is connected by a pivot to an upstanding extension of said table, a vertical rod which extends through said table, the upper end of said vertical rod being connected pivotally to said upper lever between its pivot and said clamping device, said upper lever being upwardly biased, the lower end of said rod being pivotally connected to a lower lever which is connected by a pivot to an arm which depends from said table, a second air-cylinder which is located above said lower lever, the upper end of said second air-cylinder being connected to said table, a second plunger which fits piston-like in said second air-cylinder, said second plunger extending through the bottom of said second air-cylinder, the lower end of said second plunger being connected pivotally to said lower lever between the ends thereof, an air-inlet pipe, branch pipes connected to said air-inlet pipe through an operator-controlled valve, said branch pipes being connected respectively to the lower end of the first air-cylinder and to the upper end of the second air-cylinder.

2. A machine for reaming the interior wall of the neck-portion of a doll-head, comprising a frame, a table connected to said frame, said table having an opening which has a vertical axis, a hollow support fixed to the top of said table, said support having a vertical bore which is alined with said opening, a vertical shaft located below said table, said shaft having a vertical axis of rotation which is coincident with said vertical axis of said opening, said shaft being mounted to be moved vertically up-and-down while maintaining said shaft in vertical position, a reamer fixed to the top of said shaft, a vertically movable clamping device located above said table and alined with the bore of said support, said clamping device being upwardly vertically biased by a biasing spring, said shaft and said clamping device being respectively actuated by respective actuating-means, said respective actuating-means being simultaneously actuated to actuate said shaft and said clamping device in respective opposed vertical directions, said clamping device blocking said vertical bore of said support to prevent the insertion of a doll-head into the bore of said support when said shaft is in upper operating position.

3. A machine according to claim 2 in which each of said respective operating-means includes a pressure-air-cylinder and a piston slidable therein, said air-cylinders having a common and operator-actuated inlet valve for the inlet of compressed air into both said cylinders.

FRANK F. STELZ.

REFERENCES CITED

The following references are of record in the file of this patent:

UNITED STATES PATENTS

| Number | Name | Date |
| --- | --- | --- |
| 1,520,181 | Flick et al. | Dec. 23, 1924 |
| 2,093,909 | Dodge | Sept. 21, 1937 |
| 1,238,362 | Thompson, Jr. | Aug. 28, 1917 |